April 25, 1939. F. J. LA MERE 2,155,425
ELECTRIC STOVE OR THE LIKE
Filed Oct. 3, 1936
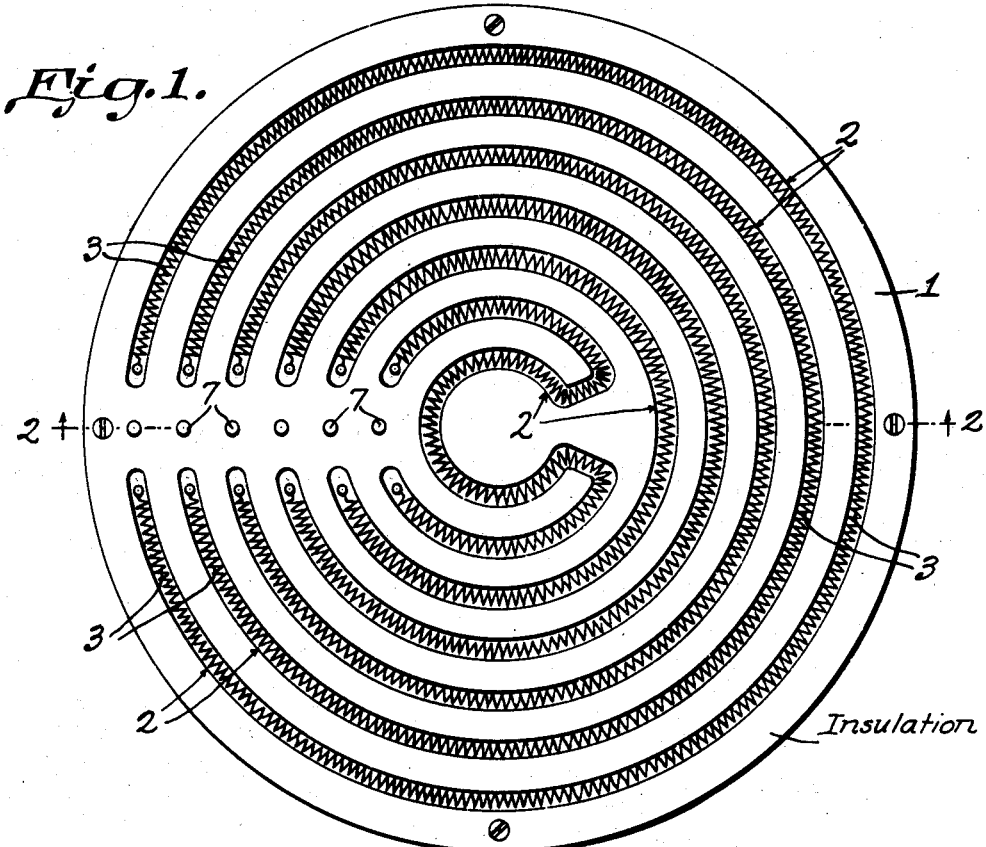
Fig. 1.
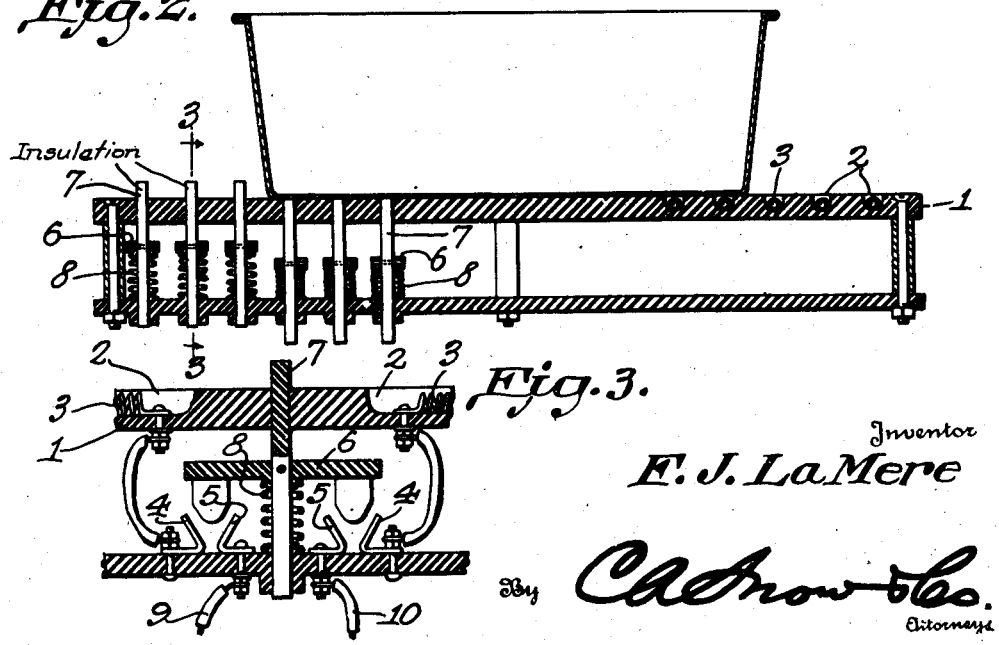
Fig. 2.
Fig. 3.
Inventor
F. J. LaMere
By C. A. Snow & Co.
Attorneys April 25, 1939.  F. J. LA MERE  2,155,425

ELECTRIC STOVE OR THE LIKE

Filed Oct. 3, 1936  2 Sheets—Sheet 2

Inventor
F. J. La Mere
By C. A. Snow & Co.
Attorneys.

Patented Apr. 25, 1939

2,155,425

UNITED STATES PATENT OFFICE 2,155,425

ELECTRIC STOVE OR THE LIKE

Frank J. La Mere, Minneapolis, Minn.

Application October 3, 1936, Serial No. 103,935

5 Claims. (Cl. 219—37)

This invention relates to electric stoves and like devices designed primarily for cooking purposes, the primary object being to provide a means under the control of the utensil or utensils used on the stove, whereby the effective heating area of the stove will be increased or reduced automatically to adapt itself to the size of the article being heated.

Heretofore electric stoves have been provided with heating units each of which has been of sufficient size to properly heat utensils of different sizes but, when small utensils have been placed on them, there has been a considerable waste of current due to the use of unnecessary heat.

The present invention provides a means under the control of the utensil whereby unnecessary portions of the heating unit can be cut out of the circuit so that only enough current will be consumed to generate the heat required for the particular utensil supported above the heating unit.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a plan view of a heating unit provided with the present improvements.

Figure 2 is a section on line 2—2, Figure 1.

Figure 3 is a section on an enlarged scale taken on line 3—3, Figure 2.

Figure 4:
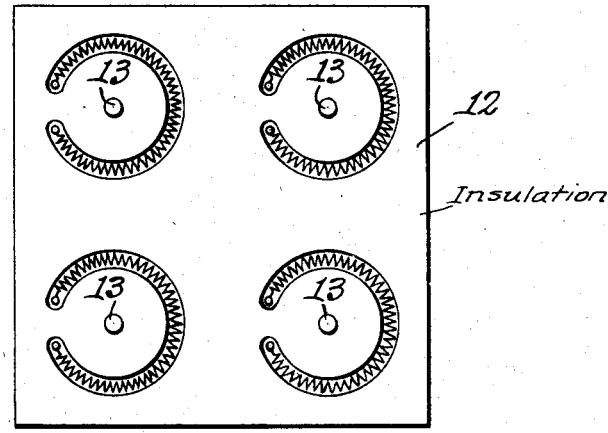
Figure 4 is a plan view of a modified form of unit arrangement.
Figure 5:
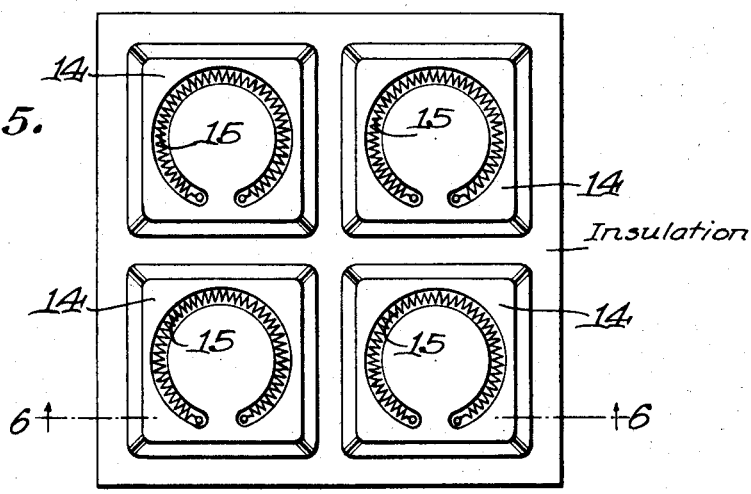
Figure 5 is a plan view of another arrangement of unit.

Referring to the figures by characters of reference 1 designates the usual ceramic disk or plate of non-conducting material which can be of any desired size and shape and is formed in its upper surface with the usual concentric grooves 2 for receiving the heating element or elements.

In the structure shown in Figure 1, a series of concentric heating elements 3 is employed, one of these elements being seated in each of the grooves 2 and each element having its terminals connected to contacts 4. A second pair of contacts 5 is provided for each pair of contacts 4 and one contact of each of the second pairs is electrically connected to one lead of an electric circuit while the other contacts of the second pairs are connected to the other lead of an electric circuit.

Cooperating with the contacts are switches 6 each of which has a plunger 7 extending upwardly therefrom above the level of the disk or plate 1 and all of these plungers are yieldingly supported in any suitable manner, as by means of springs 8.

Obviously whenever a plunger 7 is thrust downwardly, the switch joined thereto will engage the adjacent contacts 4 and 5 and close a circuit from the wires or leads 9 and 10 to the particular heating element connected to these contacts. Thus the element will be energized. As the several elements are connected in parallel, it is possible to simultaneously energize any number of them simply by depressing their controlling plungers and switches. Thus should a container or other article to be heated be lowered onto the heating unit, it would depress those plungers directly thereunder and cause the circuits to be closed only to the heating elements controlled by the depressed plungers. Those elements whose plungers have not been depressed will remain disconnected from the conducting wires 9 and 10. Consequently heat will be generated only directly under the utensil or other article and thus a considerable saving of current is effected where small articles are being heated.

Instead of arranging the heating elements concentrically as shown in Figure 1, they can be seated in grooves grouped together in rows or in any other arrangement within the insulating plate 12, as shown for example in Figure 4. With this arrangement a plunger 13 is mounted in the center of the space surrounded by each heating element and operates a switch in the same manner as plungers heretofore referred to so that when any plunger is depressed, the heating element controlled thereby will be placed in circuit.

Figure 6:
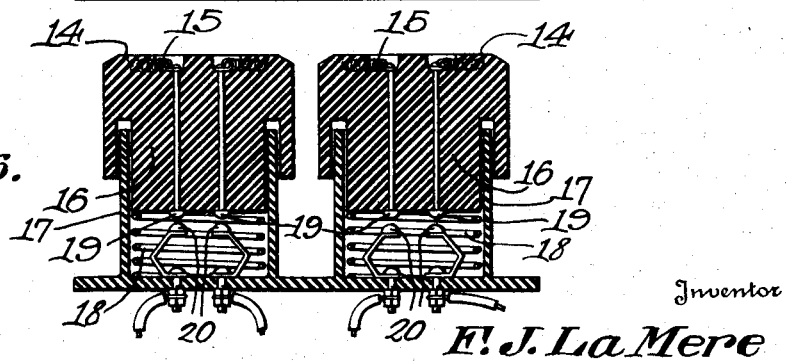
Figure 6 is a section on line 6—6, Figure 5.

Another arrangement has been illustrated in Figure 6 wherein a stove can be made up of a plurality of individual units each comprising a plate of non-conducting material 14 having a single heating element 15 therein and each plate can be provided with an extension 16 slidable within a guide 17. One or more springs 18 can be used for holding the plates 12 normally elevated and contacts which are electrically connected to the terminals of each heating element, are located where they will come into engagement with other contacts for supplying current. The contacts on the plate have been indicated at 19 while the contacts with which they cooperate have been shown at 20.

Obviously with this arrangement the weight of an utensil or other object to be heated will force the plates or movable elements downwardly so as to close the circuits to the heating elements. Those units which are not depressed will remain out of circuit. Consequently there will be no waste of current due to the heating of unused elements.

It will be understood of course that various other modifications of the invention may be made within the scope of the claims.

It is to be understood also that the improvements can be used not only on cooking stoves but in connection with steam tables and in fact wherever it is desired to maintain heat in controllable amounts.

What is claimed is:

1. A heating unit including separate substantially concentric heating elements all disposed in substantially the same plane and positioned to lie beneath an article to be heated, a normally open electric switch for each element, and means selected by the bottom of the article to be heated, for closing the switches to those elements substantially beneath the article.

2. A heating unit including separate concentric heating elements all disposed in the same plane, and utensil-controlled means shiftable under the weight of an utensil placed on the unit for selecting and energizing the respective elements beneath and positioned to heat the utensil.

3. A heating unit including separate concentric heating elements all disposed in the same plane, means for supplying energy thereto, switches for maintaining the elements normally disconnected from said means, and means selected by and slidable under the weight of an article to be heated and dependent upon the diameter of said article when centered on the unit, for actuating the switches to energize those elements beneath the article.

4. In an electric cooking stove or the like a heating unit including a group of separate concentric heating elements normally insulated from each other, and means controlled by the deposit of an article to be heated on the stove and by the diameter of the article for selecting and energizing those elements of the group beneath and in position to heat the article.

5. A heating unit including separate substantially concentric heating elements all disposed about a common center, leads for supplying electricity thereto, a switch for each element, means for holding the switch normally open, and a plunger for each switch adapted to be actuated by the weight of an article to be heated, said plungers being so positioned that only the elements covered by the article to be heated will be energized when the plungers are actuated by said article.

FRANK J. LA MERE.